(12) United States Patent
Hung et al.

(10) Patent No.: US 7,065,026 B2
(45) Date of Patent: Jun. 20, 2006

(54) DATA SLICER CAPABLE OF AUTOMATICALLY REMOVING CURRENT MISMATCH BETWEEN CURRENT PUMPS INCORPORATED THEREIN AND ITS OPERATING METHOD

(75) Inventors: Wei-Chou Hung, Taipei Hsien (TW); Kou-Chih Peng, Taipei Hsien (TW); Chia-Ching Lee, Taipei Hsien (TW)

(73) Assignee: Mediatek Incorporation, Hsin-Chu Hslen (TW)

( * ) Notice: Subject to any disclaimer, the term of this patent is extended or adjusted under 35 U.S.C. 154(b) by 646 days.

(21) Appl. No.: 10/248,444

(22) Filed: Jan. 21, 2003

(65) Prior Publication Data
US 2004/0141450 A1    Jul. 22, 2004

(51) Int. Cl.
*G11B 7/00*    (2006.01)
(52) U.S. Cl. .................... 369/59.17; 369/124.01
(58) Field of Classification Search ............ 369/59.17, 369/59.21, 124.01, 124.15, 44.13
See application file for complete search history.

(56) References Cited

U.S. PATENT DOCUMENTS 5,974,088 A * 10/1999 Chang .................... 375/244

\* cited by examiner

*Primary Examiner*—Nabil Z. Hindi
(74) *Attorney, Agent, or Firm*—Winston Hsu (57) ABSTRACT

A data slicer capable of removing current mismatch between internal current pumps and its operating method is proposed. The data slicer includes a comparator for comparing an analog signal with a slice reference level to convert the analog signal into a digital signal, a counter electrically connected to the comparator for calculating a digital sum value according to logic values carried by the digital signal, and a voltage-adjusting circuit electrically connected to the comparator for adjusting the slice reference level. The voltage-adjusting circuit has two current pumps for shifting the slice reference level. The current generated by the current pumps can be adjusted according to the calculated digital sum value to reduce a difference between a first and a second binary values which are used to increase and decrease the slice reference level respectively.

20 Claims, 8 Drawing Sheets

Fig. 8

DATA SLICER CAPABLE OF AUTOMATICALLY REMOVING CURRENT MISMATCH BETWEEN CURRENT PUMPS INCORPORATED THEREIN AND ITS OPERATING METHOD

BACKGROUND OF INVENTION

1. Field of the Invention

The present invention relates to a data slicer and its operating method, and more particularly, to a data slicer capable of automatically removing the current mismatch between current pumps incorporated therein and its operating method.

2. Description of the Prior Art

With a rapid development of computer technology, most analog data can be transformed into digital data to facilitate data transmission and storage. In recent years, the use of compact discs (CDs) as a storage medium has been adopted extensively. As a result, optical recorders such as recordable compact disc (CD-R) and rewritable compact disc (CD-RW) drives have entered the mainstream of the electronic product market. A great amount of information can be stored on a compact disc through the use of these optical recorders.

Figure 1:
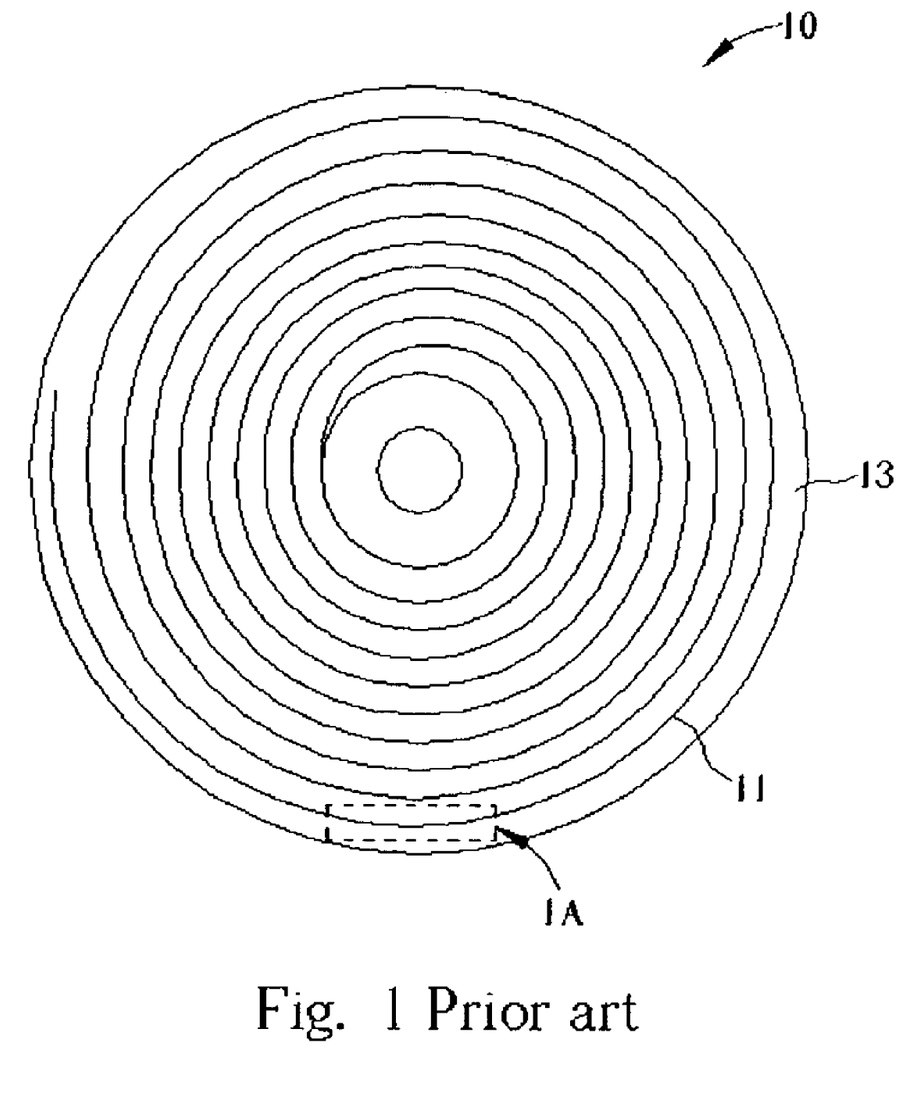
FIG. 1 is a top view of a prior art compact disc.
Figure 2:
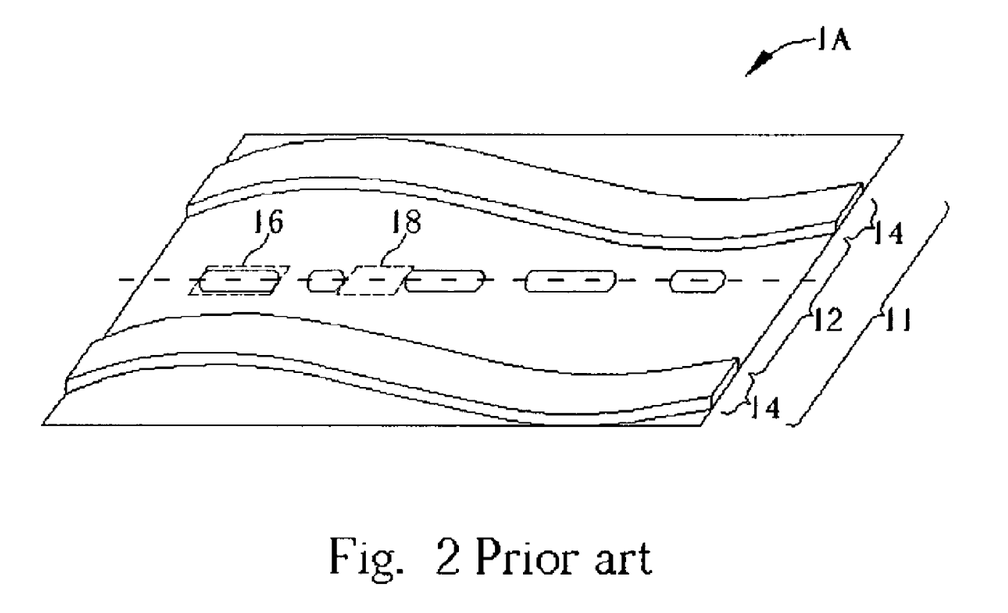
FIG. 2 is a magnified view of area 1A taken from FIG. 1 if a recordable compact disc or a rewritable compact disc is selected as an optical compact disc of FIG. 1.

Please refer to FIG. 1 which shows a top view of a typical compact disc 10. As is well known in the art, the compact disc 10 is provided with a reflecting surface 13. Generally a compact disc drive uses an optical pick-up head to emit a laser beam onto the reflecting surface 13 of the compact disc 10, and the incident laser beam is further reflected by different parts of the reflecting surface 13. The compact disc drive reads the information retained in the compact disc 10 by using the optical pick-up head to collect the reflected laser beam. That is, the compact disc drive can transform optical signals into corresponding electronic signals. On the reflecting surface 13 of the compact disc 10 is a fine spiral track 11. Taking into account a recordable compact disc (CD-R) and a rewritable compact disc (CD-RW), please refer to FIG. 2 which is a magnified view of the area 1A taken from FIG. 1 if a recordable compact disc (CD-R) or a rewritable compact disc (CD-RW) is selected as the compact disc 10 of FIG. 1. In FIG. 2, the track 11 is composed of two types of tracks, one being a data track 12 adapted to record data and the other being a wobble track 14 adpated to record related time information of each data frame. The data track 12 has a continuously spiral shape, and the wobble track 14 has an oscillating shape as shown in FIG. 2. Additionally, the curvature of the wobble track 14 is composed of small segment curves with different periods. The wobble track 14 is used to generate a corresponding wobble signal. Because the wobble track 14 is composed of small segment curves with two different periods, the wobble signal is composed of signal segments with two different frequencies. It is well known that the absolute time in pre-groove (ATIP) information is modulated by frequency modulation (FM). Therefore, the wobble signal can be demodulated to recover the ATIP information that is used to record information such as minutes, seconds, and data frames related to each data track 12. The surface of the wobble track 14 protrudes from the reflecting surface 13, and the data track 12 is located inside a groove formed by the protruding wobble track 14 as shown in FIG. 2. The data track 12 has a plurality of pit areas 16 and a plurality of land areas 18. Each pit area 16 and land area 18 are used to represent digital data "1" and "0" respectively.

Figure 3:
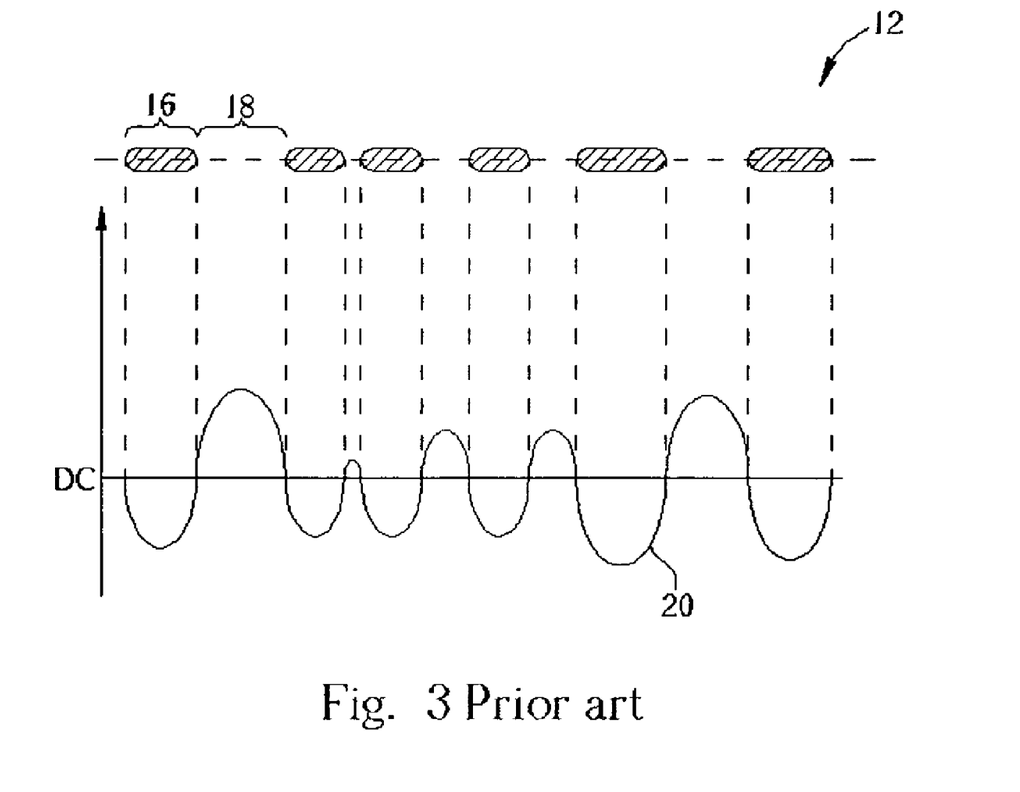
FIG. 3 is a diagram showing the detection of a reflected laser signal from the data track of an optical compact disc.

Please refer to FIG. 3, which is a diagram showing the detection of reflected laser signal from the data track 12 as shown in FIG. 1. When the optical pick-up head emits a laser beam with a predetermined radiation power on the data track 12, the optical pick-up head simultaneously detects a reflected laser beam. If the optical pick-up head moves to the pit areas 16, the emitted laser beam is scattered. Therefore, the radiation power of the reflected laser beam detected by the optical pick-up head is weaker. On the contrary, if the pick-up head moves to the land areas 18, the emitted laser beam is mostly reflected. Therefore, the radiation power of the reflected laser beam here about detected by the optical pick-up head is greater than that generated from the pit areas 16. The optical pick-up head generates a detecting signal 20 according to the radiation power of the reflected laser beam. It is well known that the detecting signal 20 is an AC coupled RF signal. As shown in FIG. 3, each of the pit area 16 corresponds to a portion of the detecting signal 20 having a negative amplitude as compared with a DC level, and each of the land area 18 corresponds to a portion of the detecting signal 20 having a positive amplitude as compared with the DC level. The DC level is a long-term average of amplitudes of the detecting signal 20. The digital data stored on the data track 12 have been encoded according to a predetermined method so that a corresponding digital sum value (DSV) approaches 0. In other words, the total number of "1" and the total number of. "0" ideally should be equal to make the digital sum value approach 0. The total length of pit areas 16 on the data track 12, therefore, will be equal to the total length of land areas 18 on the data track 12 so as to make the DSV equal to 0.

When the optical pick-up head reads data from the compact disc 10 of FIG. 1, the optical pick-up head accordingly generates the analog detecting signal 20. A data slicer is then widely used to convert the analog detecting signal 20 into corresponding digital data. Please refer to FIG. 4, which is a circuit diagram of a prior art data slicer 30. The data slicer 30 has a comparator 32, two current pumps 34, 36, an inverter 35, a capacitor 37, a low pass filter (LPF) 38, and two switches 41, 42. The LPF 38 includes a resistor 39 and a capacitor 40. The comparator 32 has one input terminal (non-inverting input terminal) electrically connected to the detecting signal 20, and another input terminal (inverting input terminal) electrically connected to the output of LPF 38 for receiving a slice reference level $V_r$. The comparator 32 is used to compare the detecting signal 20 with the slice reference level $V_r$. If the amplitude of the detecting signal 20 is greater than the slice reference level $V_r$, the comparator 32 outputs a high voltage level representing a logic high value ("1" for example). The switch 41 is turned on accordingly, but switch 42 is turned off owing to the inverter 35. The current pump 34 starts charging the capacitor 37 so as to increase the slice reference level $V_r$ by a first offset value. If the amplitude of the detecting signal 20 is less than the slice reference level $V_r$, the comparator 32 outputs a low voltage level representing a logic low value ("0" for example). The switch 42 is turned on owing to the inverter 35, but the switch 41 is turned off. The current pump 36 starts discharging the capacitor 37 so as to decrease the slice reference level $V_r$ by a second offset value. The LPF 38 functions as an integrator to adjust the slice reference level $V_r$ according to the operations of current pumps 34, 36. In the prior art data slicer 30, the current pumps 34, 36 are supposed to be identical. That is, the first offset value should be equal to the second offset value. However, current pump 34 is not identical to current pump 36 even both are fabricated by the same semiconductor process. There is a mismatch between the current pumps 34, 36. When the current pumps 34, 36 are turned on by the same control voltage, the first offset value is possibly not identical to the second offset value. Is this way, the slice reference level $V_r$ will be shifted upward or downward after a long period of time.

Figure 5:
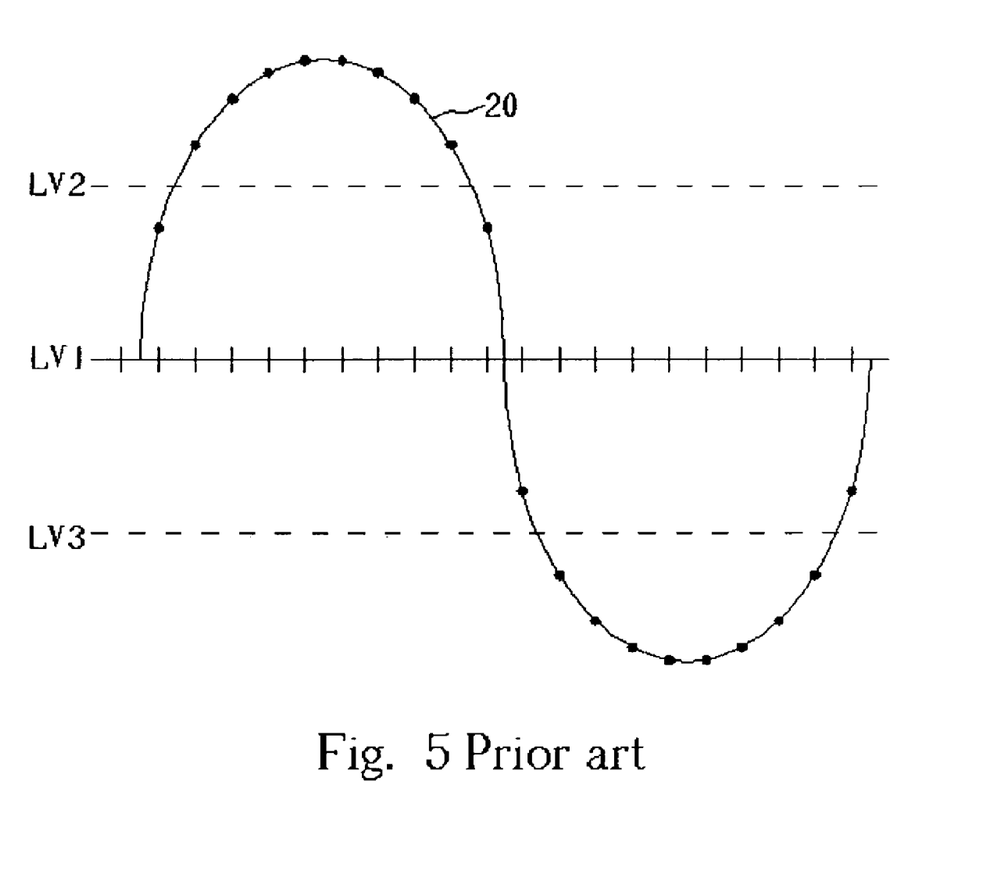
FIG. 5 is a schematic diagram showing a mismatch between the current pumps within a data slicer of FIG. 4.

Please refer to FIG. 5, which is a diagram showing the mismatch between the current pumps 34, 36. The detecting signal 20, which is an analog RF signal, is inputted into the comparator 32 of the data slicer 30. Suppose that the digital data retained in the compact disc 10 corresponds to a "zero-DSV". When the corresponding detecting signal 20 is sliced by the data slicer 30 to reproduce the original digital data, the DSV relating to the reproduced digital data should be 0. If the current pumps 34, 36 are identical and have the same circuit characteristic, the long-term average of the slice reference level $V_r$ approaches LV1 shown in FIG. 5. It is obvious that the reproduced digital data are "11111111110000000000". The total number of "1"s is equal to the total number of "0"s. The DSV, therefore, is equal to 0. If the first off set value is greater than the second offset value, the charging effect on the capacitor 37 is more powerful than the discharging effect on the capacitor 37 after a long period of time. The long-term average of the slice reference level $V_r$ is then shifted upward from LV1 (ideal value) to LV2. It is obvious that the reproduced digital data are "01111111110000000000". The total number of "1"s is less than the total number of "0"s. The DSV of the digital data, therefore, is equal to a negative number (−2 for example). If the first offset value is less than the second offset value, the discharging effect on the capacitor 37 is more powerful than the charging effect on the capacitor 37 after a long period of time. The long-term average of the slice reference level $V_r$ is then shifted downward from LV1 (ideal value) to LV3. It is obvious that the reproduced digital data are "11111111111000000001". The total number of "1"s is greater than the total number of "0"s. The DSV of the digital data, therefore, is equal to a positive number (2 for example).

Because there is a mismatch between the current pumps 34, 36, the actual reference level $V_r$ is deviated from an ideal value so that the DSV of the reproduced digital data runs out of a reasonable tolerance window. The total number of error bits in the reproduced digital data increases the loading of the following error correction circuit designed to recover the original digital data retained on the compact disc 10. In other words, the mismatch between the current pumps 34, 36 greatly affects the accuracy of the output data generated from the data slicer 30. The performance of the data slicer 30 is then deteriorated.

SUMMARY OF INVENTION

It is therefore a primary objective of the claimed invention to provide a data slicer capable of removing the current mismatch between the current pumps incorporated therein, and it is also an object of the present invention to provide a method for enabling the data slicer to remove the current mismatch between the current pumps within the data slicer for solving the above-mentioned problems.

According to a first respect of the claimed invention, a data slicer is disclosed. The data slicer comprises a comparator for comparing an analog signal with a slice reference level to convert the analog signal into a digital signal, a counter electrically connected to the comparator for calculating a digital sum value during a predetermined period of time according to logic values carried by the digital signal, a voltage-adjusting circuit electrically connected to the counter for adjusting the slice reference level, and a low-pass filter electrically connected to the voltage-adjusting circuit for outputting the slice reference level to the comparator. The voltage-adjusting circuit is an analog circuit that increases the slice reference level by a first offset value when the digital sum value is larger than an upper limit, and decreases the slice reference level by a second offset value when the digital sum value is smaller than a lower limit.

A second respect of the present invention discloses a method for operating a data slicer, comprising the steps of: (a) comparing an analog signal with a slice reference level to convert the analog signal into a digital signal, calculating a digital sum value during a predetermined period according to logic values carried by the digital signal, and (c) adjusting the slice reference level according to the digital sum value by increasing the slice reference level by a first offset value when the digital sum value is larger than an upper limit, and decreasing the slice reference level by a second offset value when the digital sum value is smaller than a lower limit.

It is an advantage of the claimed invention that the data slicer adjusts the output current of the current pumps to reduce the difference between a first offset value and a second offset value. Therefore, the actual slice reference level is maintained within a predetermined tolerance window so that accuracy of the reproduced digital data generated by the data slicer is greatly improved.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 4:
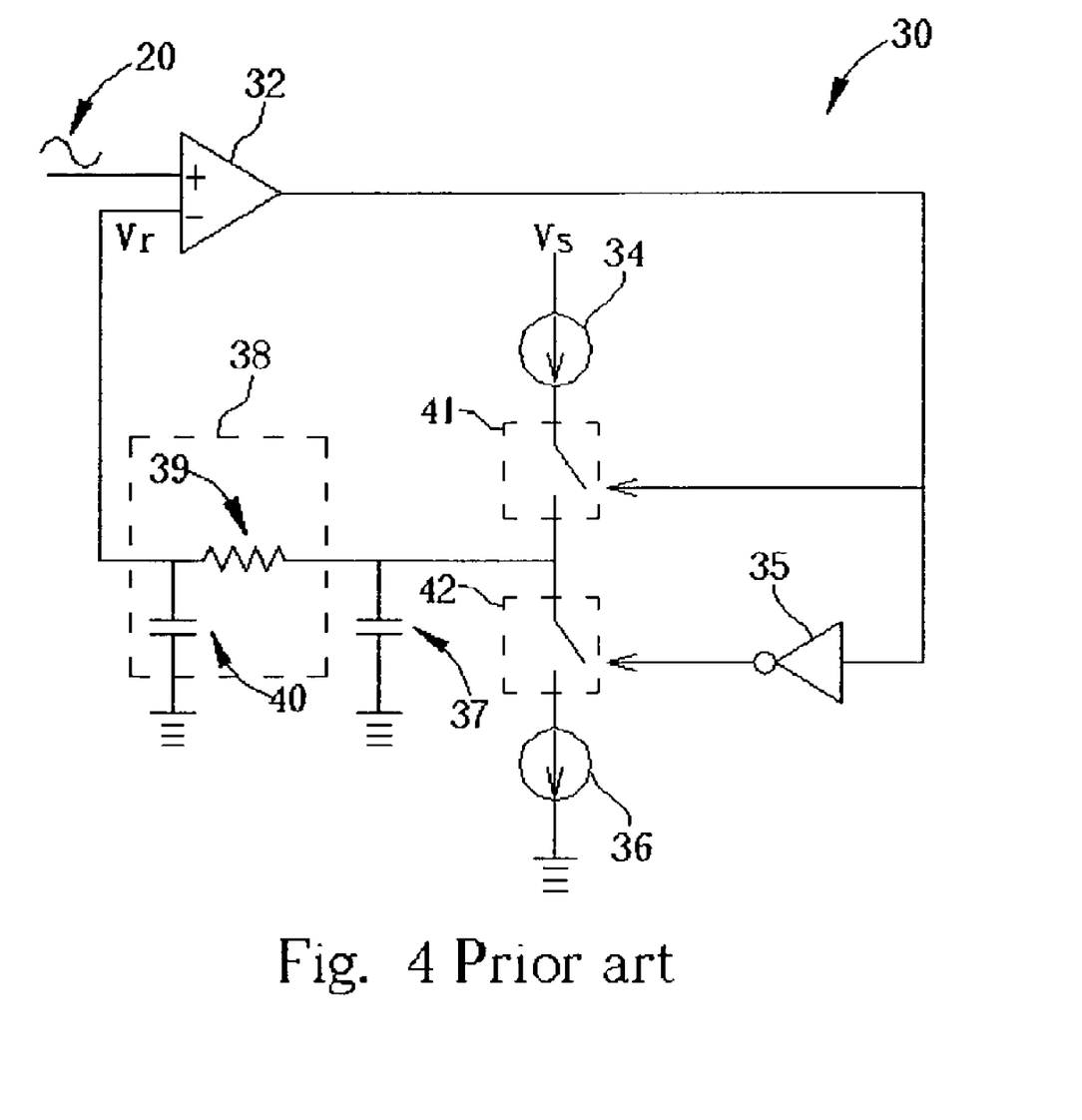
FIG. 4 is a circuit diagram of a prior art data slicer.
Figure 6:
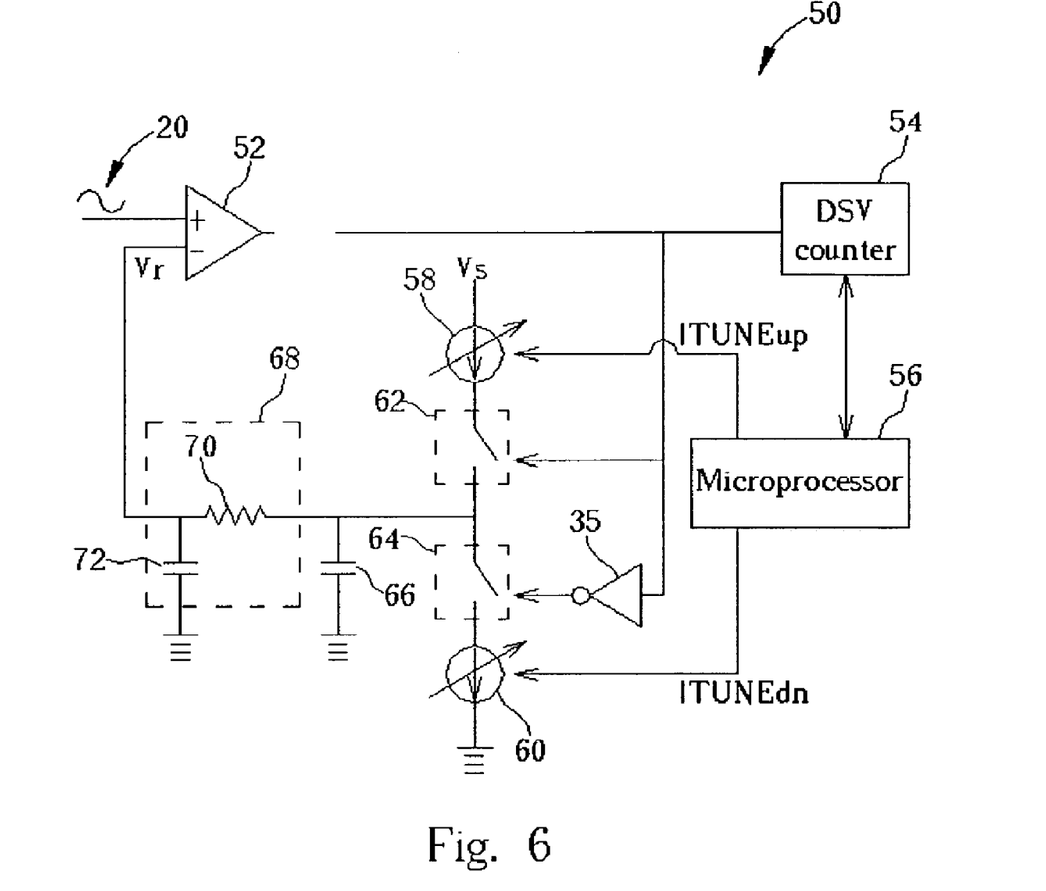
FIG. 6 is a diagram of a data slicer according to the present invention.
Figure 7:
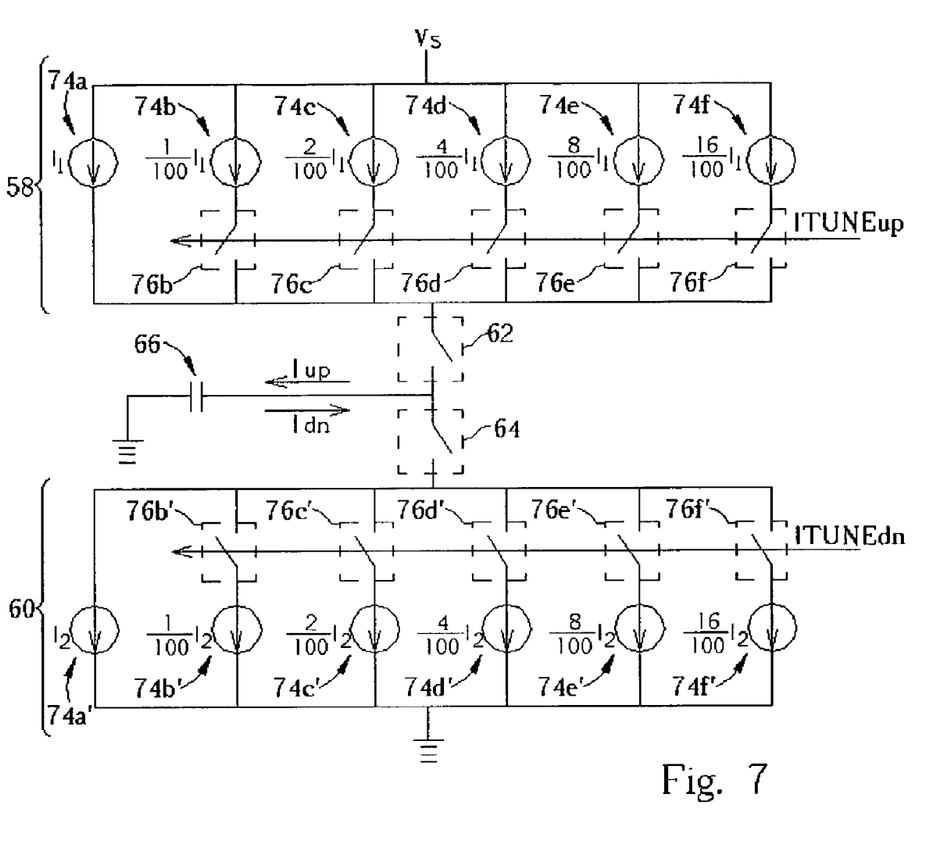
FIG. 7 is a diagram of current pumps shown in FIG. 6.

Please refer to FIG. 6, which is a circuit diagram of a data slicer 50 according to the present invention. The data slicer 50 has a comparator 52, a DSV counter 54, a microprocessor 56, two current pumps 58, 60, two switches 62, 64, a capacitor 66, and a low-pass filter 68 including a resistor 70 and a capacitor 72. One input terminal (non-inverting terminal) of the comparator 52 is used to receive the detecting signal 20 generated by an optical pick-up head, and another input terminal (inverting terminal) is used to receive a slice reference level $V_r$. The comparator 52 repeatedly compares the detecting signal 20 with the slice reference level $V_r$ to reproduce the original digital data. The DSV counter 54 is used to calculate DSV of the digital data outputted from the comparator 52. That is, when the comparator 52 outputs a high voltage level representing a logic high value ("1" for example), the DSV counter 54 increases the DSV of the digital data outputted from the comparator 52. On the contrary, when the comparator 52 outputs a low voltage level representing a logic low value ("0" for example), the DSV counter 54 decreases the DSV of the digital data outputted from the comparator 52. In the preferred embodiment, the output currents of the current pumps 58, 60 are adjustable. The microprocessor 56, therefore, is used to control the adjusting process of the current pumps 58, 60 according to the DSV calculated by the DSV counter 54. If the switch 62 is turned on, the current pump 58 starts to charge the capacitor 66 to increase the slice reference level $V_r$ by a first offset value. If the switch 64 is turned on, the current pump 60 starts to discharge the capacitor 66 to decrease the slice reference level $V_r$ by a second offset value. The current pumps 58, 60 and the capacitor 66 function as a voltage-adjusting circuit which adjusts the slice reference level $V_r$ in response to a comparison result derived from the comparator 52. In addition, the low-pass filter 68 functions as an integrator for outputting the slice reference level $V_r$ which is a long-term average of the voltage maintained by the capacitor 66. Please refer to FIG. 7 which is a circuit diagram of the current pumps 58, 60 shown in FIG. 6. Each of the current pumps 58, 60 has a plurality of current sources 74 connected in parallel for outputting currents of different levels, and a plurality of switches 76 each controls a current flow path of a respective current source 74. It is noteworthy that an input terminal of each current source 74a, 74b, 74c, 74d, 74e, 74f is electrically connected to a high voltage ($V_S$) and an input terminal of each current source 74a', 74b', 74c', 74d', 74e', 74f' is electrically connected to a low voltage (grounding voltage). The switches 76 are controlled by the control signals $ITUNE_{up}$, $ITUNE_{dn}$ generated by the microprocessor 56. The current sources 74a, 74a" which function similarly as the current pumps 34, 36 shown in FIG. 4 are used to adjust the voltage hold by the capacitor 66. The current sources 74b, 74c, 74d, 74e, 74f are used to tune up the output current of the current pump 58, and the current sources 74b', 74c', 74d', 74e', 74f' are used to tune down the output current of the current pump 60. The current $I_{up}$ related to the current pump 58 is represented by the following equation.

$$I_{up} = I1 + \frac{1}{100}I1*S1 + \frac{2}{100}I1*S2 + \frac{4}{100}I1*S3 + \frac{8}{100}I1*S4 + \frac{16}{100}I1*S5$$

If any of the switches 74b, 74c, 74d, 74e, or 74f is turned on, any symbol of S1, S2, S3, S4, or S5 in the above equation that corresponds to the turned-on switch represents a 1. For example, when switches 74b, 74e are turned on, the current $I_{up}$ becomes $$\left(I1 + \frac{1}{100}I1*1 + \frac{2}{100}I1*0 + \frac{4}{100}I1*0 + \frac{8}{100}I1*1 + \frac{16}{100}I1*0\right).$$

Therefore, the current $I_{up}$ can be easily adjusted by the control signal $ITUNE_{up}$ to be $$\left(1 + \frac{n}{100}\right)*I1$$

wherein $0 \leq n \leq 31$ (n is an integer).

Similarly, the current $I_{dn}$ related to the current pump 58 is represented by the following equation.

$$I_{dn} = I2 + \frac{1}{100}I2*S1' + \frac{2}{100}I2*S2' + \frac{4}{100}I2*S3' + \frac{8}{100}I2*S4' + \frac{16}{100}I2*S5'$$

If any of the switches 74b', 74c', 74d', 74e', or 74f' is turned on, any symbol of S1', S2', S3', S4', or S5' in the above equation that corresponds to the turn-on switch represents a 1. Similarly, the current $I_{dn}$ can be easily adjusted by the control signal $ITUNE_{dn}$ to be $$\left(1 + \frac{n}{100}\right)*I2$$

wherein $0 \leq n \leq 31$ (n is an integer).

Figure 8:
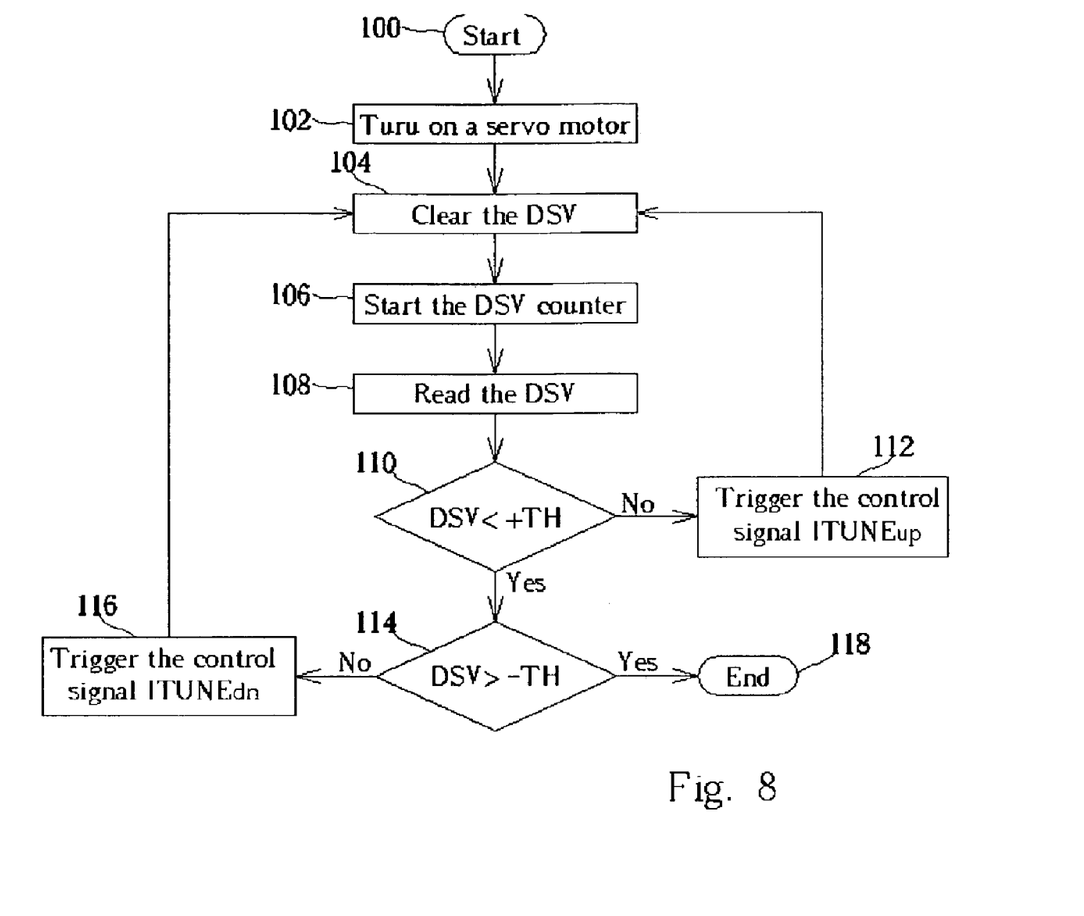
FIG. 8 is a flow chart of the method for operating the data slicer according to the present invention.

Please refer to FIG. 8, which is a flow chart of the method for operating the data slicer 50 according to the present invention. The data slicer operation includes following steps.

Step 100: Start;

Step 102:

Turn on a servo motor to spin a compact disc, and use an optical pick-up head to read data retained on the compact disc;

Step 104:

Clear the DSV calculated by the DSV counter 54, and assign an initial value to the DSV;

Step 106: Start the DSV counter to calculate the DSV from the initial value;

Step 108: Read the DSV after a predetermined period of time;

Step 110:

Is the DSV less than an upper limit +TH? If so, go to step 114; otherwise, go to step 112;

Step 112:

The microprocessor 56 generates the control signal $ITUNE_{up}$ to the current pump 58 for increasing the first offset value by controlling the current sources 74b, 74c, 74d, 74e, 74f. Jump to step 104;

Step 114:

Is the DSV greater than a lower limit −TH? If so, go to step 118; otherwise, go to step 116;

Step 116:

The microprocessor 56 generates the control signal $ITUNE_{dn}$ to the current pump 60 for increasing the second offset value by controlling the current sources 74b', 74c', 74d', 74e', 74f'. Jump to step 104;

Step 118: End.

The data slicer operation is described as follows. The servo motor is first turned on to spin the compact disc according to a predetermined rule (step 102). For example, the servo motor spins the compact discussing a constant angular velocity (CAV) mechanism or a constant linear velocity (CLV) mechanism. Then, the optical pick-up head reads data retained on the compact disc, and generates the detecting signal 20. The present DSV is then cleared and preset to an initial value 0 (step 104). The DSV counter 54 is actuated to calculate the DSV according to the output digital data of the comparator 52 from the initial value (step 106). After a predetermined period of time, the DSV generated by the DSV counter 54 is retrieved to determine whether the actual slice reference level $V_r$ is shifted from a desired long-term average (step 108). The microprocessor 56 compares the retrieved DSV with an upper limit +TH (step 110). If the DSV is greater than the upper limit +TH, the actual slice reference level $V_r$ is shifted down from the desired long-term average. As shown in FIG. 5, if the actual slice reference level $V_r$ is to be shifted downward, the total number of "1"s is greater than the total number of "0"s. That is, the corresponding DSV becomes a positive number because the second offset value caused by the current pump 60 is greater than the first offset value caused by the current pump 58. Therefore, the microprocessor 56 in the preferred embodiment increases the first offset value to raise the actual slice reference level $V_r$ (step 112). If the DSV is less than the upper limit +TH, the microprocessor 56 compares the DSV with a lower limit TH (step 114). If the DSV is less than the lower limit −TH, the actual slice reference level $V_r$ is shifted up from the desired long-term average. As shown in FIG. 5, if the actual slice reference level $V_r$ is to be shifted upward, the total number of "0"s is greater than the total number of "1"s. That is, the corresponding DSV becomes a negative number because the first offset value caused by the current pump 58 is greater than the second offset value caused by the current pump 60. Therefore, the microprocessor 56 in the preferred embodiment increases the second offset value to lower the actual slice reference level $V_r$ (step 116). The upper limit +TH and the lower limit TH defines an acceptable tolerance window for the data slicer 50. The adjustments for the first and second offset values (steps 112, 116) are repeated until the DSV is converged within the tolerance window during the predetermined period of time. As mentioned before, the current $I_{up}$ is $$\left(1 + \frac{n}{100}\right) * I1,$$

and the current $I_{dn}$ is $$\left(1 + \frac{n}{100}\right) * I2.$$

Therefore, the currents $I_{up}$ and $I_{dn}$ can be increased gradually by selecting an appropriate number n. When the DSV finally fits the convergence requirement, the existing mismatch problem related to the current sources 74a, 74a' is solved. As shown in FIG. 5, after either the LV2 or the LV3 is adjusted to approach the LV1, the total number of error bits outputted from the comparator 52 is greatly reduced. To sum up, accuracy of the reproduced digital data generated by the data slicer 50 is greatly improved.

It is noteworthy that only five current sources 74b, 74c, 74d, 74e, 74f are shown in FIG. 7 to tune the current $I_{up}$ and five current sources 74b', 74c', 74d', 74e', 74f' are shown in FIG. 7 to tune the current $I_{dn}$ for simplicity. The current pump 58 can use more current sources to accurately adjust the current $I_{up}$. Similarly, the current pump 60 can use more current sources to accurately adjust the current $I_{dn}$. However, the implementation of using more current sources to adjust the currents $I_{up}$ and $I_{dn}$ requires a longer period of time to finish the initialization operation shown in FIG. 8. In addition, in the preferred embodiment, the switches 62, 64 are not turned on simultaneously so as to turn on either the current pump 58 or the current pump 60 at a time. However, the key feature of the present invention is to minimize the difference between the first and second offset value. With regard to the first offset value, an increase d1 of the current $I_{up}$ is equivalent to an increase d2 of the current $I_{up}$ and an increase d3 of the current $I_{dn}$ wherein d1 is equal to d2−d3 when both switches 62, 64 are turned on. With regard to the second offset value, an increase d1' of the current $I_{dn}$ is equivalent to an increase d2' of the current $I_{dn}$ and an increase d3' of the current $I_{up}$ wherein d1' is equal to d2'−d3' when both switches 62, 64 are turned on. Furthermore, although FIG. 7 only discloses increasing the first or second offset value to reduce the difference between the first and second offset values, the first and second offset values can also be adjusted by decreasing at least one of the first and second offset values. Moreover, the first and second offset values can be adjusted by increasing one of the first and second offset values and reducing the other offset value simultaneously. In other words, the present invention is implemented by finely tuning the current pumps within the data slicer to reduce the difference between the first and second offset values.

In contrast to the prior art data slicer, the data slicer according to the present invention adopts adjustable current pumps, and the claimed method adjusts the output current of the current pumps to reduce the difference between a first offset value and a second offset value. The actual slice reference level is converged within a predetermined tolerance window so that the accuracy of the reproduced digital data generated by the data slicer is greatly improved.

Those skilled in the art will readily observe that numerous modifications and alterations of the data slicer may be made while retaining the teachings of the invention. Accordingly, the above disclosure should be construed as limited only by the metes and bounds of the appended claims.

What is claimed is:

1. A data slicer comprising:
    a comparator for comparing an analog signal with a slice reference level to convert the analog signal into a digital signal;
    a counter electrically connected to the comparator for calculating a digital sum value during a predetermined period according to logic values carried by the digital signal; and
    a voltage-adjusting circuit electrically connected to the counter for adjusting the slice reference level, the voltage-adjusting circuit comprising: a first current pump for generating a first current: and a second current pump for generating a second current, wherein a first offset value and a second offset value are set according to the first current and the second current, and the voltage-adjusting circuit is configured to increase the slice reference level by the first offset value when the digital sum value is larger than an upper limit, and decrease the slice reference level by the second offset value when the digital sum value is smaller than a lower limit.

2. The data slicer of claim 1 wherein the counter is configured to clear and preset an initial digital sum value in advance of calculating the digital sum value.

3. The data slicer of claim 1 further comprising a low-pass filter electrically connected to the voltage-adjusting circuit for outputting the slice reference level to the comparator.

4. The data slicer of claim 1 wherein the first current pump is used to generate the first offset value to increase the slice reference level, and the second current pump is used to generate die second offset value to decrease the slice reference value.

5. The data slicer of claim 4 wherein the slice reference level is adjusted by charging and discharging a capacitor according to the first current and the second current.

6. The data slicer of claim 5 wherein the voltage-adjusting circuit further comprising a microprocessor for generating a first control signal to control the first current pump to increase the first offset value when the digital sum value is larger than the upper limit, and generating a second control signal to control the second current pump to increase the second offset value when the digital sum value is smaller than the lower limit.

7. The data slicer of claim 6 wherein the first current pump comprises a plurality of current sources each of which is connected in parallel and electrically connected with a switch for increasing the first current to increase the first offset value when the digital sum value is larger than the upper limit.

8. The data slicer of claim 7 wherein the switch is controlled by the first control signal from the microprocessor to turn on and off.

9. The data slicer of claim 6 wherein the second current pump comprises a plurality of current sources each of which is electrically connected with a switch for increasing the second current to increase the second offset value when the digital sum value is smaller than the lower limit.

10. The data slicer of claim 9 wherein the switch is controlled by the second control signal from the microprocessor to turn on and off.

11. The data slicer of claim 1 wherein the data slicer is integrated into an optical disc drive.

12. The data slicer of claim 11 wherein the analog signal is generated from a pick-up head of the optical disc drive while the pick-up head reads an optical compact disc.

13. A method for operating a data slicer, the method comprising:
 (a) comparing an analog signal with a slice reference level to convert the analog signal into a digital signal;
 (b) calculating a digital sum value during a predetermined period according to logic values carried by the digital signal; and
 (c) controlling a first current pump and a second current pump to generate a first current and a second current for setting a first offset and a second offset, and adjusting the slice reference level according to the digital sum value by increasing the slice reference level by the first offset value when the digital sum value is larger than an upper limit, and decreasing the slice reference level by the second offset value when the digital sum value is smaller than a lower limit.

14. The method of claim 13 further comprising clearing and presetting an initial digital sum value in advance of calculating a digital sum value.

15. The method of claim 13 wherein the step (c) comprises adjusting the slice reference level by charging and discharging a capacitor according to the first current and the second current.

16. The method of claim 13 wherein the controlling of the first current pump and the second current pump is achieved by a microprocessor.

17. The method of claim 13 wherein the controlling of the first current pump comprises controlling a plurality of current sources connected in parallel to adjust the first current so as to adjust the first offset value.

18. The method of claim 13 wherein the controlling of the second current pump comprises controlling a plurality of current sources connected in parallel to adjust the second current so as to adjust the second offset value.

19. The method of claim 13 wherein the data slicer is applied to an optical disc drive.

20. The method of claim 19 wherein the analog signal is generated from a pick-up head of the optical disc drive when the pick-up head reads an optical compact disc.

* * * * *